(12) United States Patent
Pandurang et al.

(10) Patent No.: US 8,230,872 B2
(45) Date of Patent: Jul. 31, 2012

(54) STEAM TRAP

(75) Inventors: Chavan Patil Pranil Pandurang, Pune (IN); Joshi Milind Arvind, Pune (IN)

(73) Assignee: Spirax Marshall Pvt. Limited, Pune (IN)

( * ) Notice: Subject to any disclaimer, the term of this patent is extended or adjusted under 35 U.S.C. 154(b) by 835 days.

(21) Appl. No.: 12/297,479

(22) PCT Filed: Apr. 17, 2007

(86) PCT No.: PCT/IN2007/000149
§ 371 (c)(1),
(2), (4) Date: Jan. 29, 2009

(87) PCT Pub. No.: WO2009/019711
PCT Pub. Date: Feb. 12, 2009

(65) Prior Publication Data
US 2010/0170575 A1     Jul. 8, 2010

(30) Foreign Application Priority Data
Apr. 17, 2006    (IN) ............................ 600/MUM/2006

(51) Int. Cl.
*F16T 1/20*     (2006.01)

(52) U.S. Cl. ........................................ 137/192; 137/184
(58) Field of Classification Search ................. 137/173, 137/177, 183, 184, 187, 192
See application file for complete search history.

(56) References Cited

U.S. PATENT DOCUMENTS

| | | | |
|---|---|---|---|
| 668,302 A * | 2/1901 | Wright ........................ 137/184 |
| 742,308 A * | 10/1903 | Gerrard ........................ 137/184 |
| 2,790,456 A * | 4/1957 | Shaw et al. ................... 137/184 |
| 3,011,719 A * | 12/1961 | Jorgensen ........................ 236/59 |
| 4,276,354 A | 6/1981 | Winiasz |
| 4,387,733 A | 6/1983 | Balazs et al. |
| 4,545,397 A | 10/1985 | Yumoto |
| 4,623,091 A | 11/1986 | Stein |
| 4,706,699 A | 11/1987 | Foller |
| 7,096,880 B2 | 8/2006 | Aoki et al. |
| 7,171,976 B2 | 2/2007 | Joo et al. |

* cited by examiner

*Primary Examiner* — Craig Schneider
(74) *Attorney, Agent, or Firm* — Robert P. Michal; Lucas & Mercanti, LLP

(57) ABSTRACT

A steam trap for discharge of condensate is disclosed. The steam trap includes a chamber, a first orifice and at least one other orifice. Each of the orifices has closing elements. The closing elements of all orifices are connected to an interlinked lever arrangement operated by a float. The orifices open in response to level of condensate in the chamber of the trap.

13 Claims, 13 Drawing Sheets

STEAM TRAP

FIELD OF INVENTION

This invention relates to a steam trap and more particularly to a float type steam trap.

INTRODUCTION

Discovery of steam and the possibilities of using steam as a motive power, made the industrial revolution possible. Learning to harness the potential of steam has contributed immensely to the comforts of the modern world and may be considered as a significant step forward in the development of industrialization.

Heat energy converts water to steam. This conversion takes place around 100° C. depending upon atmospheric pressure. Steam at this pressure is of very limited industrial use. It is common practice to generate and use steam at higher pressures and temperatures to suit various industrial applications.

On giving up the kinetic or thermal energy, steam condenses and converts back to liquid state. Presence of condensed water in the steam system leads to many problems like water hammer, loss of heat energy, (live steam cools rapidly as it comes in contact with water) and therefore condensed water has to be drained out of the system.

Letting off the condensate into an open drain is probably the quickest way of removing the condensate from the system. But this is not practical as live steam will also escape along with the condensate leading to higher steam generation costs and it is advantageous to reuse the condensed water as boiler feed water to save on purification and generation costs.

Steam traps are automatic valves that release condensed steam [condensate] from a steam space while preventing the loss of live steam. They also remove air and non-condensable particles from the steam space.

Steam traps are generally installed at the transition point of high pressure steam systems and low pressure condensate (water) collection systems. Steam traps are designed to prevent loss of heat energy from the system and at the same time quickly remove condensate from the high pressure steam system space.

Many types of steam traps are known in the art with their varied applications. Steam traps are broadly classified as 1. Thermostatic Steam Trap Thermostatic steam traps operate on the principle of difference in temperature of steam and condensate. Condensate cools rapidly due to heat loss to the surrounding and a thermostatic steam trap will open and purge the condensate as the lower temperature is sensed. When the steam reaches the trap the temperature will increase and the trap will then close.

2. Mechanical Type Steam Trap

Mechanical Type steam traps operate on sensing difference in the fluid densities. A ball type float or an inverted bucket is used to sense the presence of condensed water in the trap and open the orifice to discharge the condensate and close as soon as water level drops to a pre set level.

3. Thermodynamic Steam Trap

Thermodynamic steam traps operate on sensing the change in fluid dynamics of steam. This type of trap operates on the difference in velocity or kinetic energy between steam and condensate passing through a fixed or modulating orifice.

Steam traps may also be classified on the basis of their generic operations i.e. "continuous flow" and "intermittent flow."

In the continuous flow type traps, there is a continuous discharge of condensate. These are generally float, thermostatic and fixed orifice traps. Intermittent traps work in open and closed cycles. They have a pattern of hold-discharge-hold. These traps are generally of the thermodynamic, inverted bucket and bimetallic type.

At the beginning of a steam heating process, the space in side the system is filled with air, which unless displaced, will reduce the rate of heat transfer and increase the start-up time. It is necessary to purge air as quickly as possible before it has a chance to mix with the incoming steam. Once the air and steam mix together, they can only be separated by condensing the steam and then venting the air out of the system.

Thermostatic traps are fully open at start-up and vent the air trapped in the steam system easily. Float traps are normally provided with an inbuilt thermostatic air vent to fulfill this function. Thermodynamic traps are quite capable of handling moderate amounts of air. However, the small hole in fixed orifice condensate outlet and the bleed hole in inverted bucket traps both vent air slowly. Improper air venting will increase production times, warm-up times, and corrosion.

BACKGROUND OF INVENTION

This invention relates to the mechanical type steam trap and particularly to a float type mechanical steam trap.

The main function of a float type steam trap is to drain condensate from the steam line. The conventional float type steam trap has a single orifice which in turn is operated by a float and lever mechanism. A float valve typically consists of an air tight enclosed ball made of metal or synthetic polymer material connected at the end of a pivoted arm positioned in side a chamber. When a fluid enters the chamber, the ball floats in a fluid such as water and the ball along with its arm tend to move up and down. This up and down movement is used to advantage by connecting an orifice opening and closing element at the end of the arm distal to the ball. This mechanism therefore acts as a valve for controlling the flow of fluid such as water through the orifice. Float type steam traps are so called because they have this type of mechanism installed therein.

Float type steam traps are installed on process vessels to remove condensate. The steam consumption in processes varies with time, which causes variation in the condensate load. At startup, when all processes and steam lines are cold, the rate of condensation is high. In this startup period, the trap has to handle high condensate load. Float type steam traps are sized on the basis of running condensate load and differential pressure across the trap. Hence, the steam trap selected is not able to remove condensate at startup effectively. If steam traps are sized on startup condensate loads and differential pressures across the trap, it makes the steam trap oversized. This results in requirement of more space, extra cost, and bulky installation.

Condensate loads from some processes are high, which may lie beyond the condensate handling capacity of a single orifice float trap. Two steam traps are needed to handle these high condensate loads. This needs more space, cost and the installation is bulkier. In addition, there are several other limitations which exist in the known art.

U.S. Pat. No. 4,276,354 explains a steam trap housing to suit plurality of different inlet and outlet conduit configurations. In this invention condensate handling capacity is limited to the unit selected and it cannot handle variation in condensate loads quickly.

U.S. Pat. No. 4,387,733 reveals a dual fulcrum steam trap having a large initial mechanical advantage and hemispherical valve seat with large contact area, to obtain extended operating life. However since the orifice size is fixed the condensate discharge rate will be limited to the size of the trap selected and will not be able to handle variable condensate loads effectively.

U.S. Pat. No. 4,545,397 reveals a float valve without a lever mechanism, wherein the outer surface of a hollow spherical float operates to open and close an orifice located in the valve seat. The orifice size is related and limited to the size of the float and the trap selected and will not be able to handle variable condensate loads effectively.

U.S. Pat. No. 4,623,091 reveals a float and thermostatic steam trap, in which venting and trapping functions are done by the same valve as the thermostatic actuator acts on the float linkage when the temperature is below a predetermined value. In start-up conditions and when temperature is below the predetermined value the thermostatic actuator engages, forcing the float assembly of the valve to remain open, to vent air and condensate quickly. At temperatures above the preset value the thermostatic actuator disengages completely to allow the float to open and close depending on the level of condensate in the trap chamber. Steam trap as disclosed in this document is able to handle air venting and start-up condensate loads effectively but fails to address the problem of varying condensate loads in conditions above the preset temperature. A steam trap of this design will have to be sized to meet the maximum possible condensate load for any specific application and therefore is likely to be bulky and more expensive.

U.S. Pat. No. 4,706,699 reveals a float operated steam trap in which both sides of the outlet orifice is opened and closed by sensing the pressure prevailing at the inlet of the steam trap. This invention attempts to improve the wear resistance of the valve seats but fails to address the problems of start-up air venting and fluctuating condensate loads that are encountered in normal operations.

U.S. Pat. No. 7,096,880 reveals a float operated steam trap, in this invention a valve closing member slides over a fixed seat to open and close two or more orifices. The float lever carrying the valve closing member uses the force developed by the float to slide the seat across the face of the fixed orifice. The closing member has a surface contact with the valve seat and no positive pressure is applied on the valve closing member to seal it against the valve seat. This will lead to leakage through the orifice, wear and tear due to sliding friction, and the float will have to move over a larger arc with reference to point of pivot specially if the pivot arm is short, to fully open the orifice. As the orifice is not fully open able, condensate flow will be proportionately reduced and larger sized trap will have to be used to handle the required flow rate.

U.S. Pat. No. 7,171,976 reveals a float operated steam trap with collinear inlet and outlet with threaded connection that is easy to install and prevents leakage of live steam. In this invention no provision is made to take care of start-up air venting and fluctuating condensate loads that are encountered in normal operations.

This invention seeks to overcome the limitation of the existing prior arts.

OBJECTS OF THE INVENTION

Object of this invention is to provide an efficient float type steam trap.

Another object of this invention is to provide a float type steam trap that is optimum in size.

Another object of this invention is to provide a float type steam trap wherein the size of installation is reduced.

Yet another object of this invention is to provide a float type steam trap that effectively traps and discharges condensate in a controlled manner over a wide range of operating condensate loads.

Yet another object of the invention is to provide a float type steam trap with high and variable condensate load.

Yet another object of this invention is to provide a float type steam trap with a wide range of operating condensate load and pressure difference across the trap to overcome the difficulty of selection and sizing.

Further, the object of the invention is to reduce the cost and the bulk of installations.

SUMMARY OF THE INVENTION

According to this invention there is provided a steam trap comprising
  i. a chamber defining an enclosed space, inlet means for introducing condensate bearing steam in said space; an outlet means for condensate;
  ii. a first orifice leading to said outlet means for condensate;
  iii. at least one second orifice leading to said outlet means for condensate;
  iv. a first element to control the opening of said first orifice;
  v. at least one second element to control the opening of said at least one second orifice;
  vi. a lever and link arrangement cooperating with said first element and said at least one second element; and
  v. a float fitted to said lever and link arrangement adapted to be displaced in said enclosed space, in response to a level of condensate resident in said space, from a first position in which all orifices are shut to a second position in which the lever and link mechanism actuates the first element to uncover the first orifice and to a third and subsequent position in which first and at least one second orifice is uncovered for discharge of condensate selectively from only said first or first and second orifices.

Typically, said chamber is defined by a base and a cover bolted together to form the enclosed space to make the chamber open able and said inlet and outlet are defined in said cover.

Typically, said elements are balls having diameters larger than the diameters of the orifices and said balls are secured, typically by welding respectively to wings of moveable pivoted members of said lever and link arrangement.

Typically, diameter of the said first orifice is the same, smaller or larger than the said second orifice.

Typically, a cross member is fitted between first and second element to delay the actuation of the second element in relation to the actuation of the first element.

In accordance with one embodiment of the invention a resilient element is provided between the lever link arrangement and the second element to damp the uncovering and shutting of the second orifice. Alternatively, said cross member is itself a resilient element.

In accordance with another embodiment of the invention said orifices are provided with resilient lips for resilient abutment of the elements with the orifices.

Particularly, said first and second elements are pivot ably displaceable.

In another embodiment of the invention two second orifices are provided on either side of a first orifice and two second elements are provided and said lever and link arrangement actuates the first and the two second elements.

In yet another embodiment of the invention said first and second elements are defined by a rotary element positioned between the first and the second orifices or by a slider element positioned between the first and second orifices The orifices may be formed in a single seat replaceable component adapted to be fitted to said chamber or said orifices are formed in separate seats in replaceable separate components.

BRIEF DESCRIPTION OF DRAWINGS

All the aspects and advantages of a float type steam trap as envisaged in this invention will become apparent with the description of the preferred, non-limiting embodiment, when read together with the accompanying drawings in which:

FIG. 4b Shows details of a portion of the trap of FIG. 4a;

FIG. 5a shows sectional elevation of the assembled float type steam trap of FIG. 1;

FIG. 5b Shows details of a portion of the trap of FIG. 5a;

FIG. 6a shows sectional elevation of the assembled float type steam trap of FIG. 1;

FIG. 6b Shows details of a portion of the trap of FIG. 6a;

DETAILED DESCRIPTION OF THE EMBODIMENT

Figure 1:
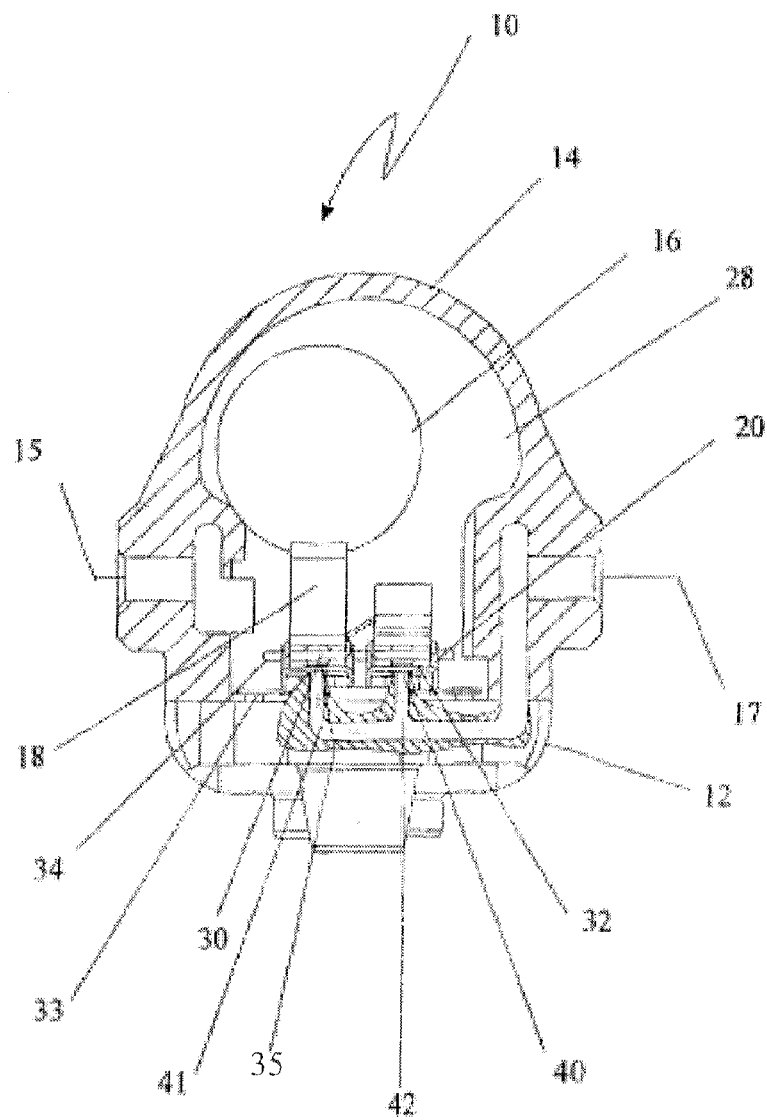
FIG. 1 Shows sectional plan of the assembled float type steam trap.

Referring to the accompanying drawing: The steam trap, in accordance with this invention is indicated generally by the reference numeral 10. It consists of a chamber 28, defined by a base 12, and cover 14. The base and the cover are bolted together by means of bolt 22, to make the chamber leak tight. The chamber has an inlet means 15 for introducing condensate bearing steam in to the chamber. The chamber has also an outlet means 17, for discharge of condensate. The inlet and outlet means are provided on the cover 14, as threaded or flanged connections.

The steam trap 10, of this invention has a first orifice 35, and a second orifice 40, as particularly seen in FIG. 1. The orifices are at the end of passages 41, 42 opening into the chamber and are formed in the base 12. The other end of the passage is in communication with the outlet 17, as particularly seen in FIG. 1 and FIG. 7. These passages 41 and 42 are formed in the base 12, and are interconnected to lead the condensate to the outlet means 17.

The steam trap 10 of this invention further includes an arrangement for opening and closing the orifices. The arrangement for opening and closing of the first orifice consists of a ball float 16, typically made of metal or synthetic polymer material, and is securely fitted at the end of a pivoted lever 18. The lever 18 is pivot-ably attached to the base 12, through the pivot frame 33 and pivot pin 34. The lever 18 is bent typically at right angles and on the bent wing an orifice closing ball element 30 is secured typically by welding. The orifice closing element 30 is a ball of diameter larger than the orifice.

Figure 2:
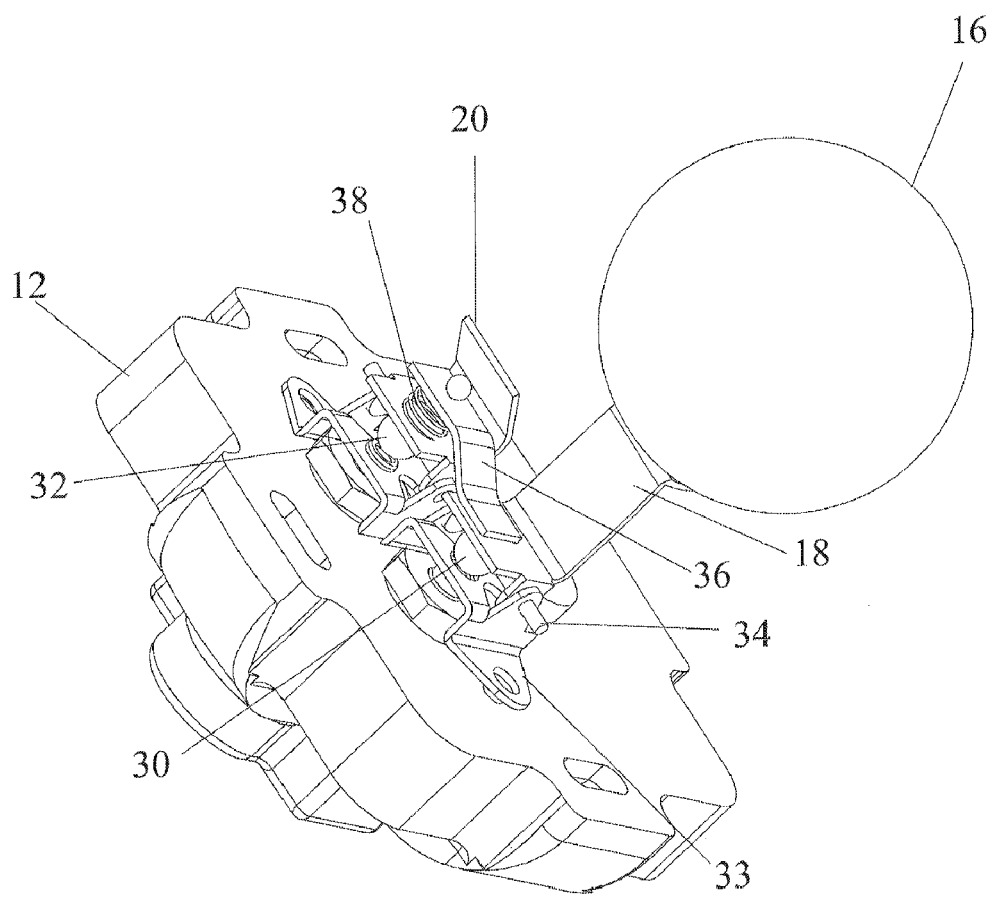
FIG. 2 Shows solid view of base unit with orifices, levers and float in assembled condition of the steam trap of FIG. 1.

The steam trap 10 of this invention also includes an arrangement for opening and closing the second orifice. As seen in FIG. 2, one end of a cross member 36 is firmly attached typically by welding to the first lever 18 and is positioned in such a way that it engages the second lever 20 in an intermediate position of the float ball 16. The lever 20 is bent typically at right angles and on the bent wing is an orifice closing ball element 32 secured typically by welding. The orifice element 32 is a ball of diameter large than the orifice.

The second lever 20 is pivotably connected to orifice closing element 32 to open and close the second orifice. A resilient member 38 (spring) is interposed between the second lever 20 and cross member 36 to damp the closing and opening movement.

The second lever 20 is pivotably connected to orifice closing element 32 to open and close the second orifice. A resilient member 38 (spring) is interposed between the second lever 20 and cross member 36 to damp the closing and opening movement.

The operation of the steam trap 10 will now be described with the help of drawings.

Figure 3:
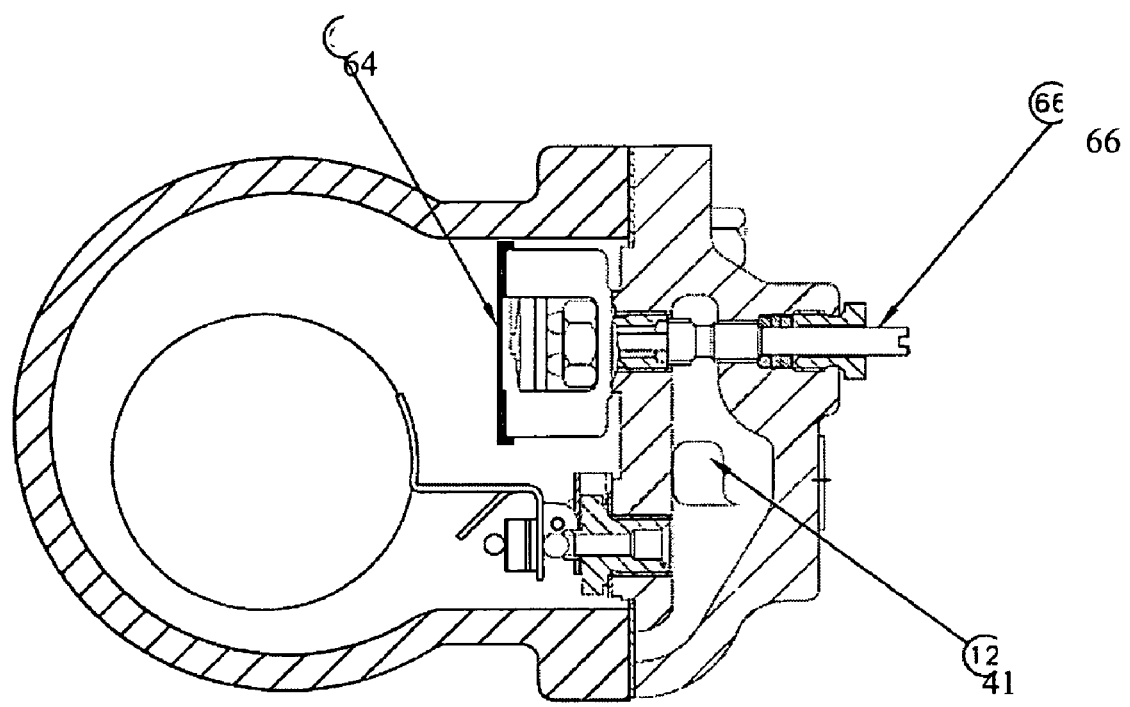
FIG. 3 Shows sectional elevation of the steam trap showing details air vent and steam lock release components.

Particularly in start-up conditions air trapped in the steam line is released through air vent 64 and steam lock is released using a steam lock release 66, as particularly seen in FIG. 3.

Figure 4A:
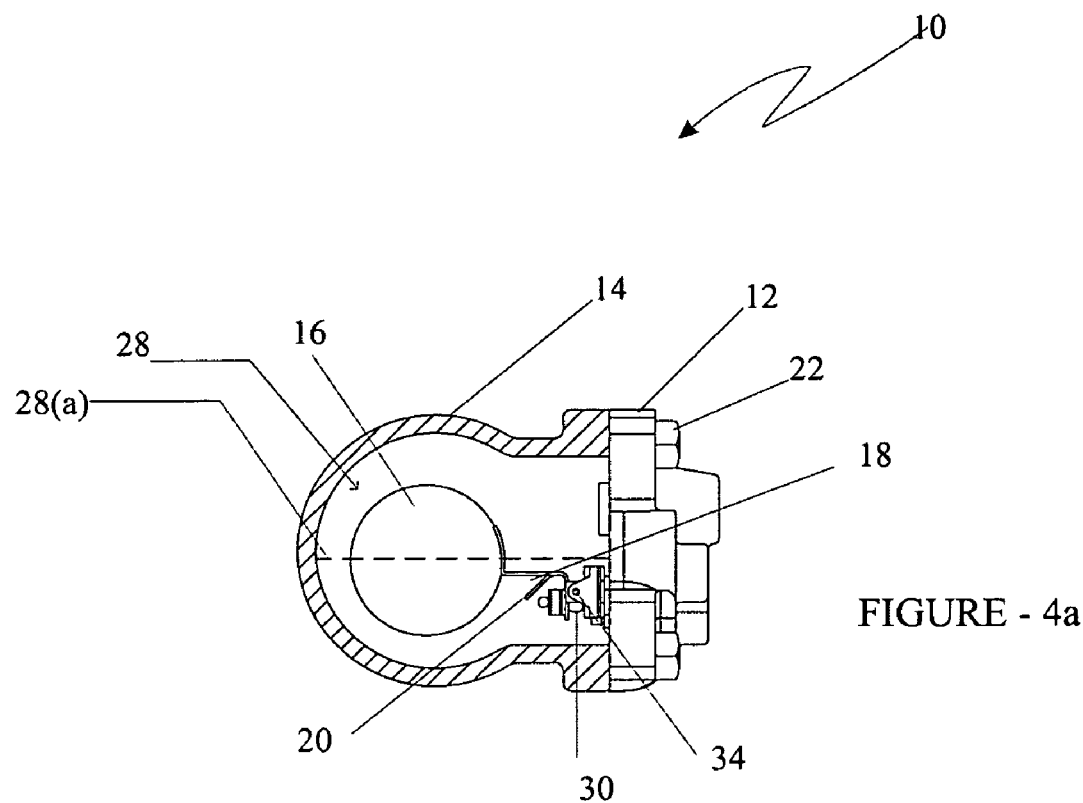
FIG. 4a Shows sectional elevation of the assembled float type steam trap of FIG. 1.
Figure 4:
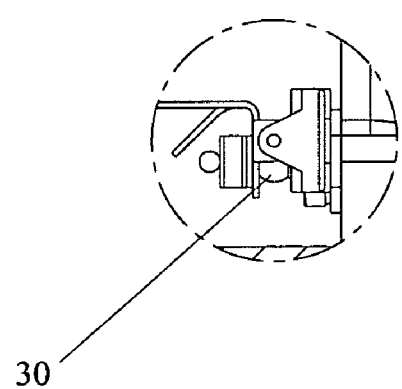

In FIG. 4a, with no condensate entering the trap the condensate level 28(a) in the chamber is low and the self weight of ball float 16 duly amplified by the first lever 18 is brought to bear upon the orifice closing element and the corresponding orifice seats, to keep both the orifices closed. FIG. 4b shows details of a portion of the trap of FIG. 4a, with both the orifices in closed position.

Figure 5:
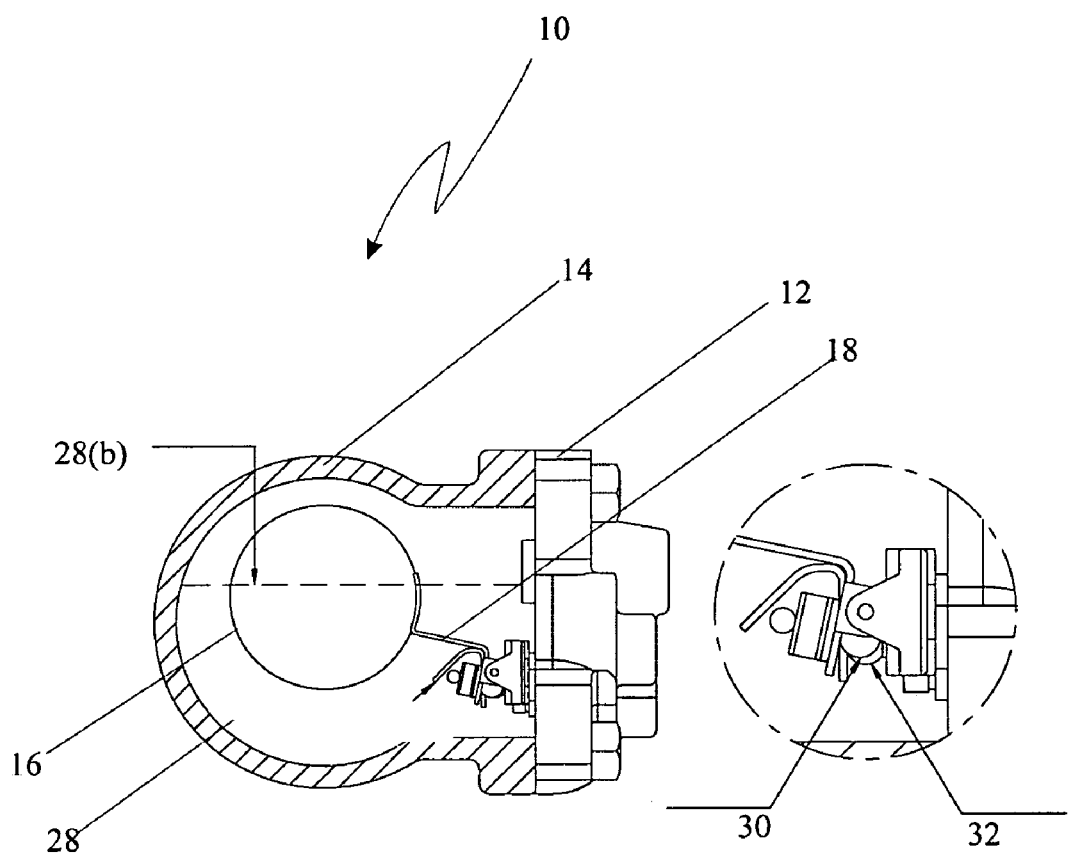

FIG. 5a a shows the position when condensate enters the trap chamber 28, and the condensate level 28(b) raises and the buoyancy of the float duly amplified by the first lever 18 lifts the orifice closing element 30, from the first orifice seat allowing condensate to pass through the orifice to the outlet. However the second orifice remains closed as the first lever 18 has not yet engaged the second lever 20. FIG. 5b shows details of a portion of the trap of FIG. 5a, with the first orifice being open and the second orifice being closed.

Figure 6:
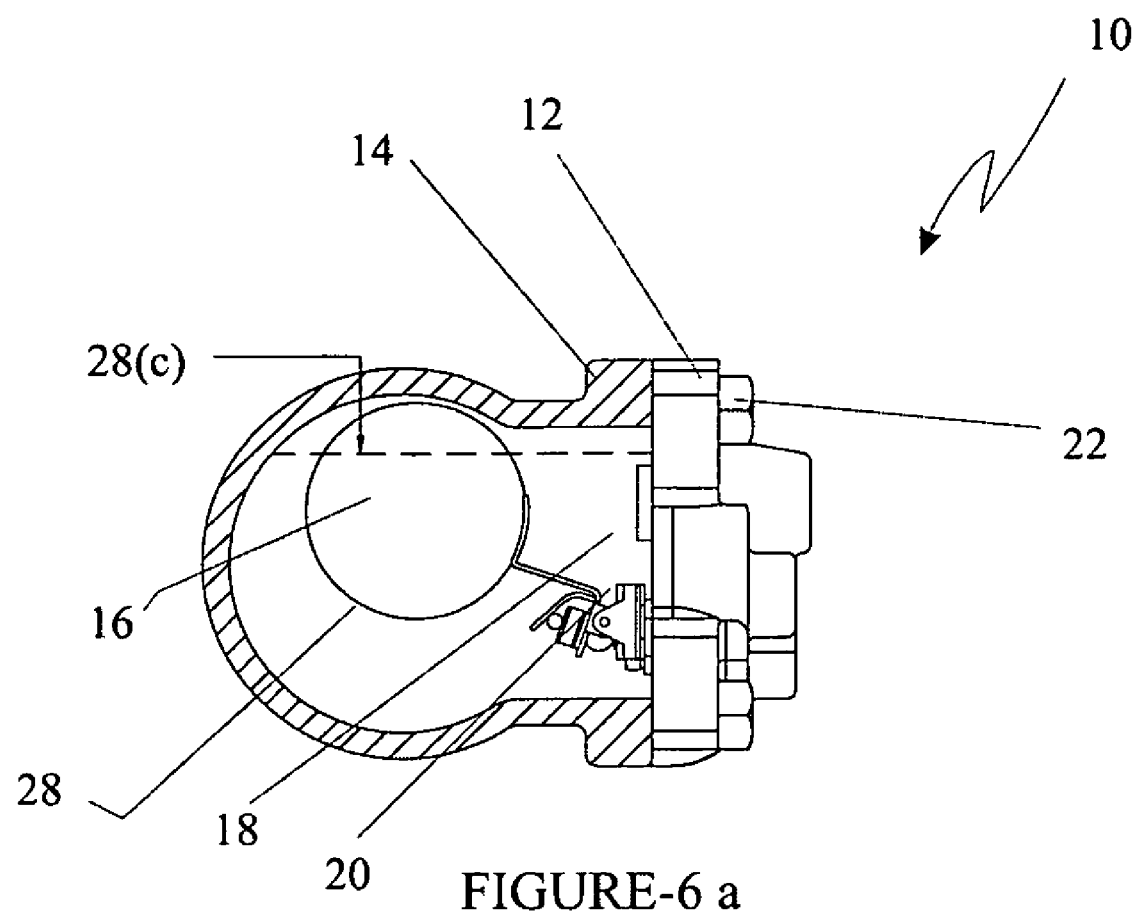
Figure 6:
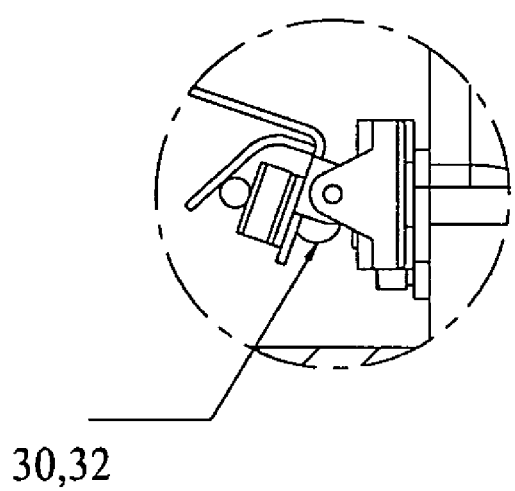

FIG. 6a shows the position when more condensate enters the trap chamber 28. The condensate level 28(c) rises the float to its topmost position and the first lever 18 engages the second lever 20 to lift both the orifice closing elements 30 and 32 off the orifice seats. In this position both the orifices discharge condensate through the outlet. FIG. 6b shows details of a portion of the trap of FIG. 6a with both the orifices in closed position.

Figure 7:
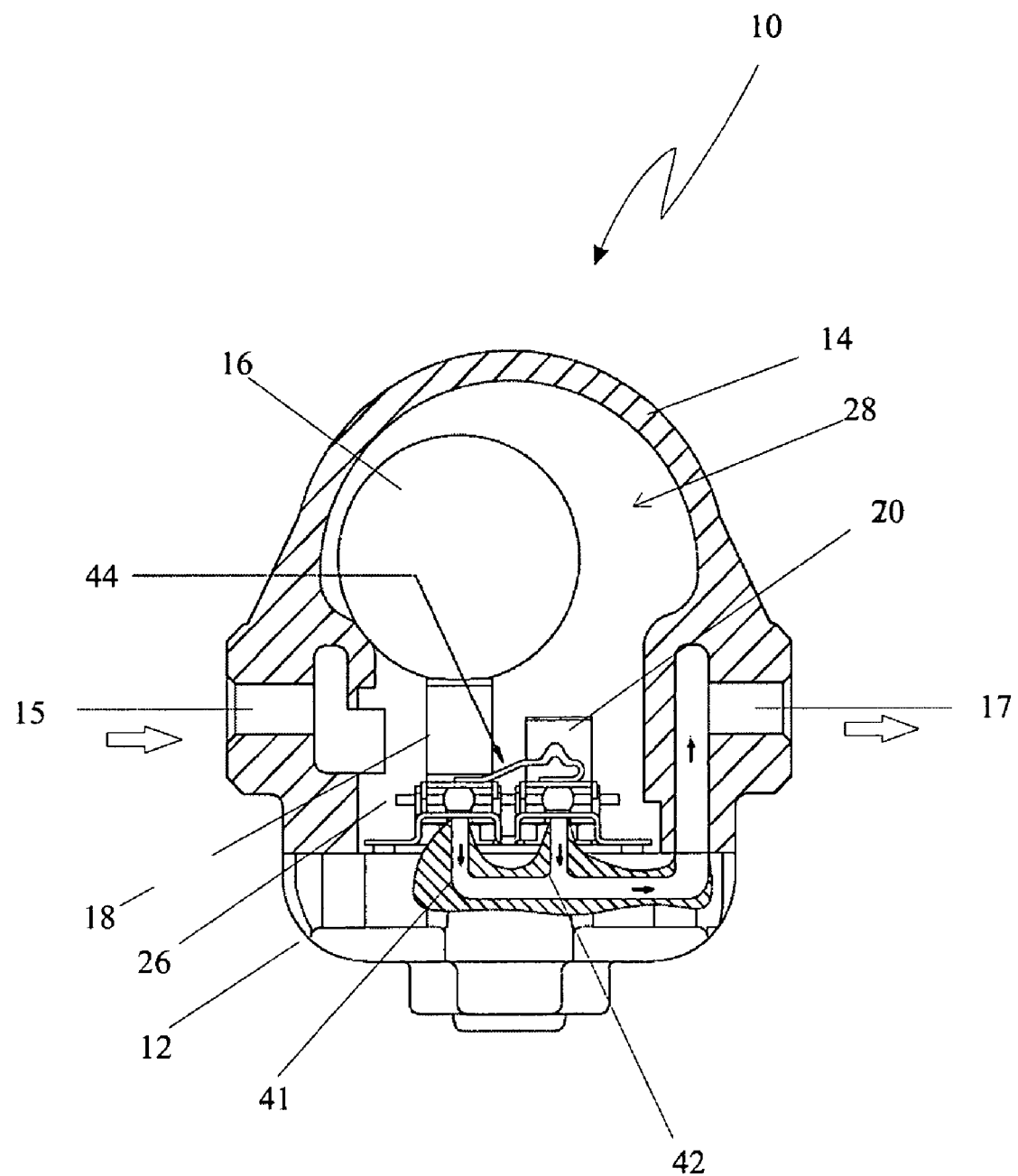
FIG. 7 Shows sectional plan of the assembled float type steam trap of an alternative embodiment with a spring member interposed between the levers.

In an alternative embodiment of this invention as shown in FIG. 7, the cross member 36 is replaced by a resilient spring member 44 to damp the closing and opening movement of the second orifice.

Figure 8:
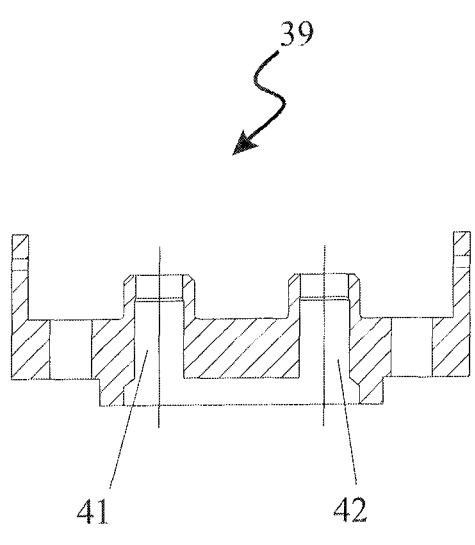
FIG. 8 Shows the detail of orifices made as a single component.

FIG. 8 shows a typical design of orifices made as a single component 39. Orifice seats are subject to erosion and wear and tear in constant use and are replaced in scheduled periodic maintenance operations. Orifices made as a single component are easier to assemble and requires less bolting/fastening members.

Figure 9:
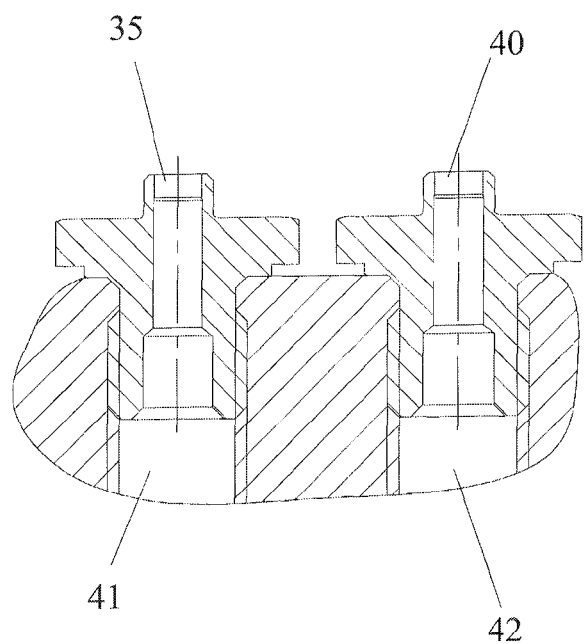
FIG. 9 Shows an alternative detail of orifices made as separate components.

FIG. 9 shows an alternative design of an orifice made as a separate component 30 or 40. This design enables replacement of separate orifice seats depending on the condition as and when required. The orifice seats are easier to manufacture and store.

Figure 10:
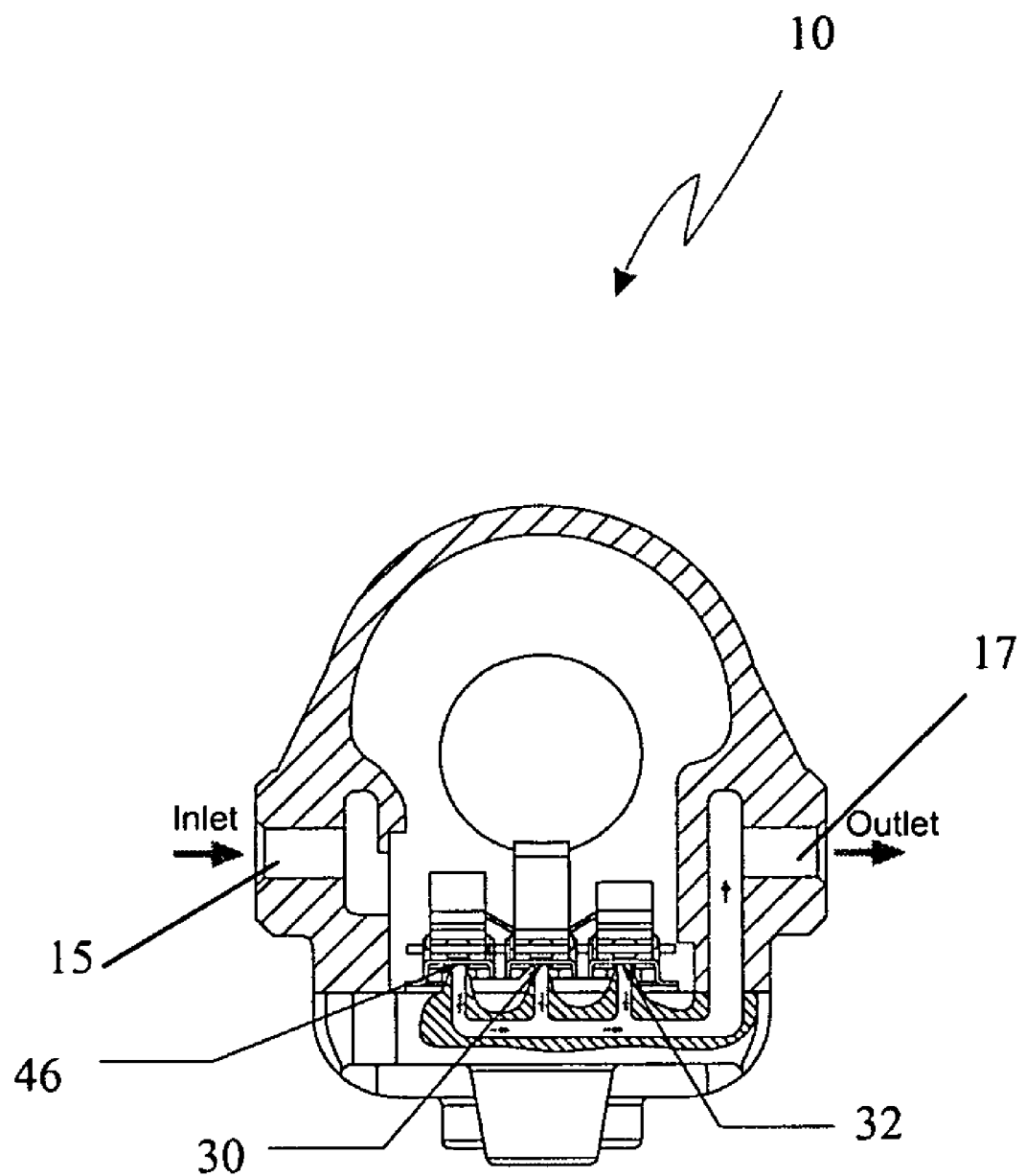
FIG. 10 Shows a sectional plan of an alternative embodiment of the float type steam trap with multi-orifice arrangement.

FIG. 10 shows a sectional plan view of an alternative embodiment of the invention with multi-orifices (not particularly numbered) comprising first orifice closing element 30, second orifice closing element 32 and a third orifice closing element 46 are seen in the FIG. 10. A single float 16 operates the lever system for opening and closing the orifices.

Figure 11:
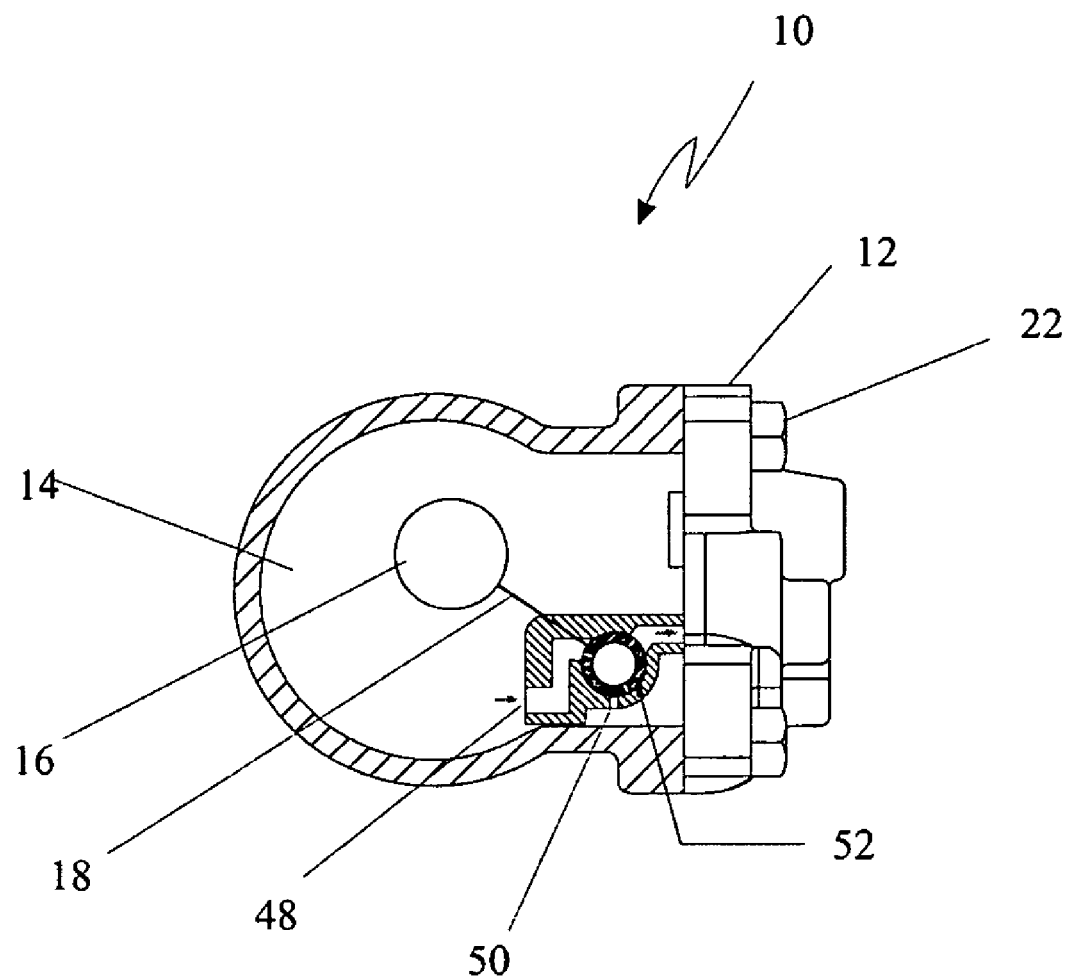
FIG. 11 Shows sectional elevation of an alternative embodiment of the float type steam trap, with rotary mechanism for opening and closing of orifices.

FIG. 11 shows an alternative embodiment of the invention with multi-orifice and rotary orifice mechanism consisting of a rotary element 52, operated by float 16 through lever 18 for opening and closing the orifice inlet ports 48 and 50.

Figure 12:
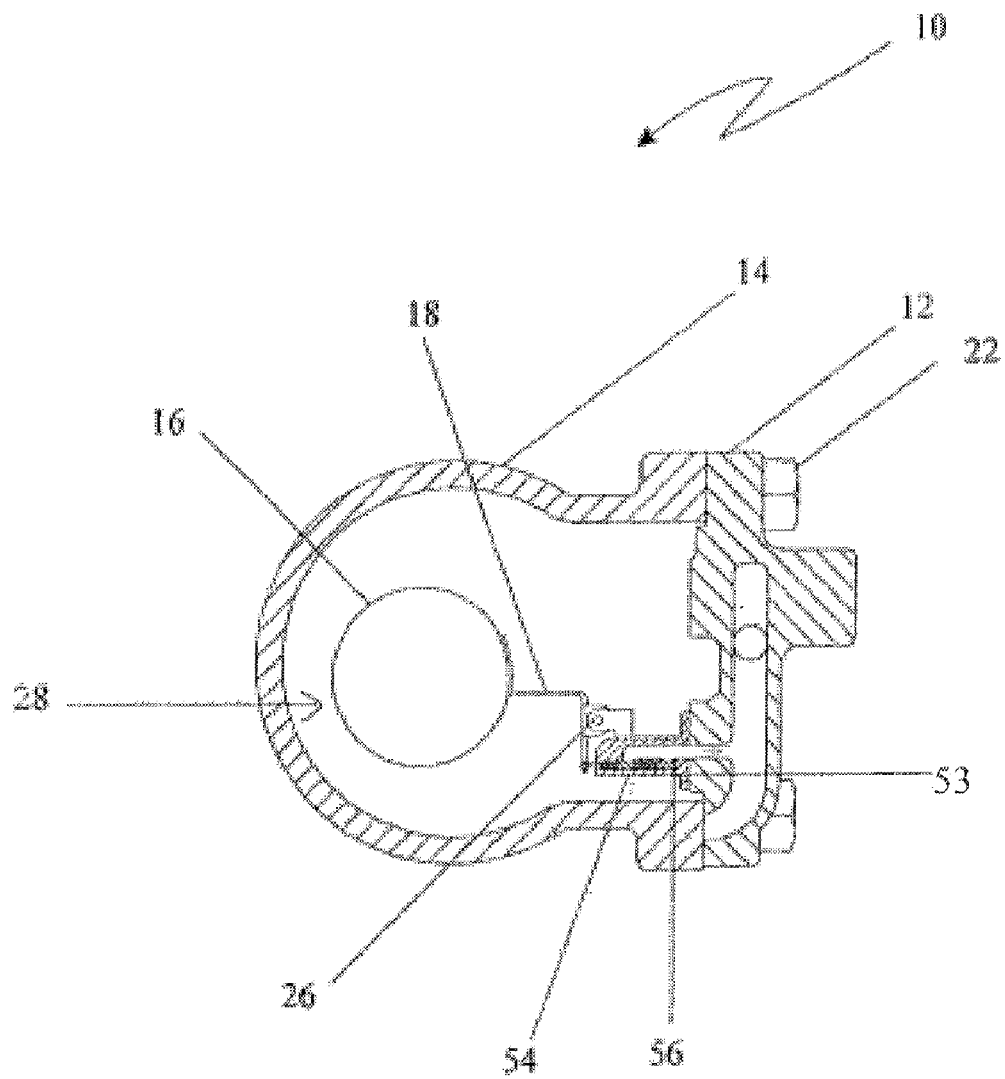
FIG. 12 Shows sectional elevation of an alternative embodiment of the float type steam trap with sliding mechanism for opening and closing of orifices.

FIG. 12 shows an alternative embodiment of the invention with multi-orifice and sliding element mechanism 53, operated by float 16 and lever arrangement 18 for opening and closing the exit orifices 54 and 56.

Experimental Data:

Tests were carried out to determine the efficiency of functioning of the steam trap of this invention as shown in FIG. 1. A test-bed was set up with a pressure gauge for measuring inlet pressure and weighing arrangement for condensate discharged by the trap. A conventional single orifice steam trap was placed in the test-bed and condensate was admitted in to the trap. Condensate discharged by the trap was collected for specific period of time and weighed to calculate discharge rate in kilograms per hour at various differential pressures across the trap. The procedure was repeated on a double orifice float type steam trap as described above.

Figure 13:
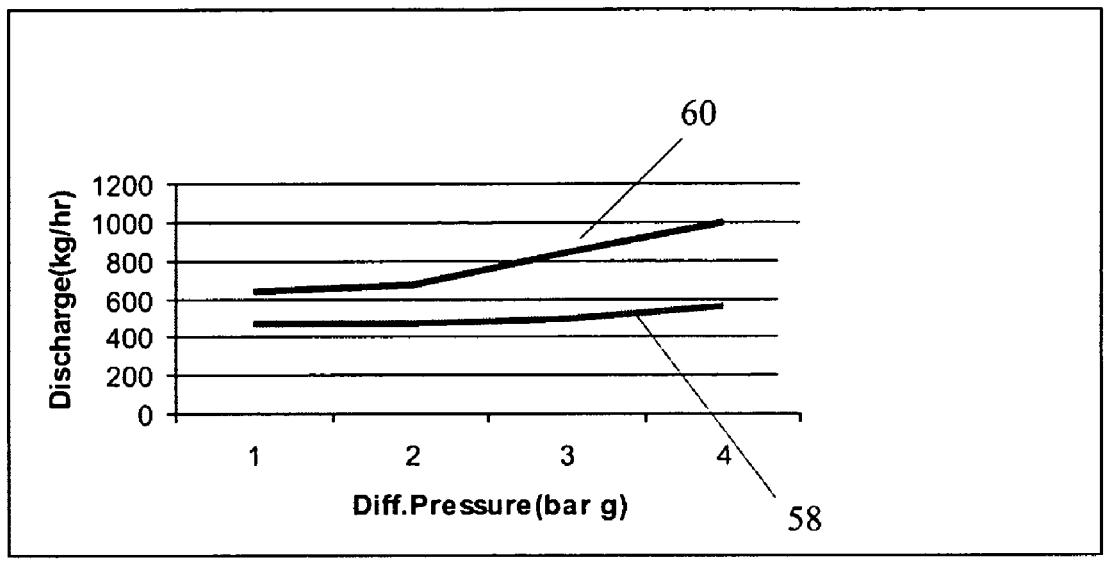
FIG. 13 Shows a graphical representation of the test results for discharge capacities of a steam trap of this invention and a conventional single orifice float type steam trap.

FIG. 13 is a graphical representation of the results of the experiments, plotted with differential pressure in x-axis and discharge rate in y-axis. Graph marked 58 depicts the test results for a conventional single orifice float type steam trap and graph marked 60 is for steam trap as envisaged in this invention.

In a single orifice steam trap the condensate discharge rate is constant at approximately at 480 Kgs/hr up to a differential pressure of 2 bar (gauge) and rises to about 590 Kgs/hr at 4 bar (gauge). In a double orifice steam trap of this invention the second orifice increases the discharge rate to 620 Kgs/hr at 1 bar (g) differential pressure and up to 1000 Kgs/hr at 4 bar (gauge). In a double orifice steam trap the discharge rate improves considerably at reduced flow velocities thereby reducing erosion and wear and tear of the orifices.

Figure 14:
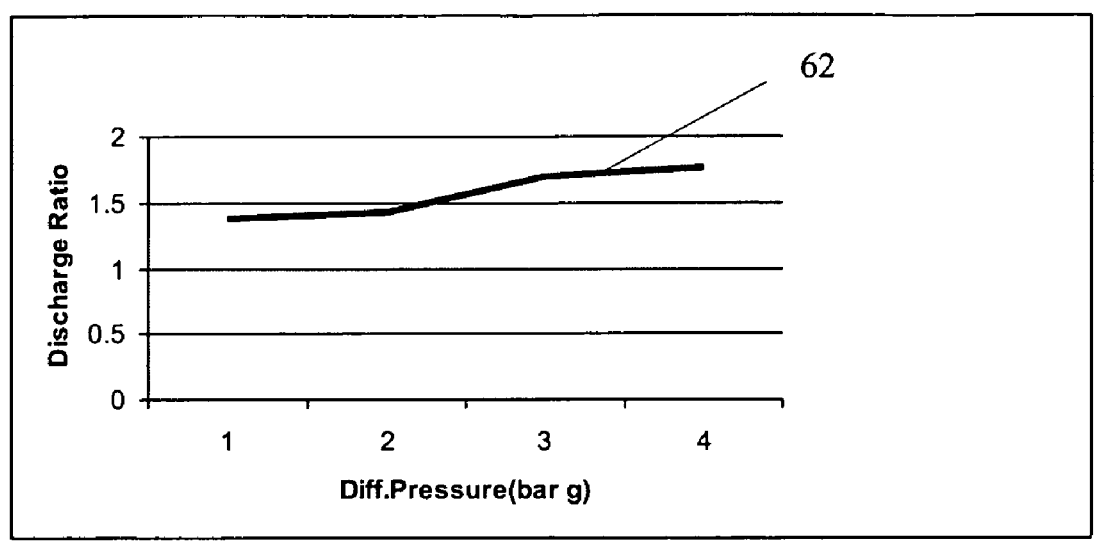
FIG. 14 Shows a graphical representation of the capacity improvement factor of a trap of this invention and a conventional single orifice float type steam trap.

FIG. 14 shows a capacity improvement factor chart based on the discharge ratio of the above test result wherein discharge ratio is plotted in y-axis and differential pressures in x axis. The graph shows clearly improvement achieved in discharge capacity of the steam trap of this invention.

While considerable emphasis has been placed herein on the particular features of a float type steam trap, the improvisation with regards to it, it will be appreciated that various modifications can be made, and that many changes can be made in the preferred embodiment without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A steam trap comprising:
   i. a chamber defining an enclosed space, inlet means for introducing condensate bearing steam in said space, and an outlet means for condensate;
   ii. a first orifice leading to said outlet means for the condensate;
   iii. at least one second orifice leading to said outlet means for the condensate;
   iv. a first element to control the opening of said first orifice;
   v. at least one second element to control the opening of said at least one second orifice;
   vi. a lever and link arrangement cooperating with said first element and said at least one second element;
   vii. a float fitted to said lever and link arrangement displaced in said enclosed space, in response to a level of condensate resident in said space, from a first position in which all orifices are shut to a second position in which the lever and link mechanism actuates the first element to uncover the first orifice and to a third and subsequent position in which the first and at least one second orifice is uncovered for discharge of the condensate selectively from only said first or first and second orifices; and
   viii. a resilient element provided between said lever and link arrangement and said second element to damp the uncovering and shutting of said second orifice.

2. A steam trap as claimed in claim 1, wherein said chamber is defined by a base and a cover bolted together to form the enclosed space to make the chamber openable and said inlet and outlet are defined in said cover.

3. A steam trap as claimed in claim 1, wherein the diameter of the said first orifice is the same, smaller or larger than the second orifice.

4. A steam trap as claimed in claim 1, wherein said first element and said at least one second element are pivotably displaceable.

5. A steam trap as claimed in claim 1, wherein two orifice closing elements are provided on either side of a first orifice closing element and said lever and link arrangement actuates the first orifice closing element and the two orifice closing elements.

6. A steam trap as claimed in claim 1, wherein said first element and said at least one second element are defined by a rotary element positioned between the first orifice and the at least one second orifice.

7. A steam trap as claimed in claim 1, wherein said first orifice and at least one second orifice are formed in a single seat replaceable component fitted to said chamber.

8. A steam trap as claimed in claim 1, wherein said first orifice and at least one second orifice are formed in separate seats in replaceable separate components.

9. A steam trap as claimed in claim 1, wherein a cross member is fitted between said first element and said at least one second element to delay the actuation of the at least one second element in relation to the actuation of the first element.

10. A steam trap as claimed in claim 9, wherein said cross member comprises a resilient element.

11. A steam trap as claimed in claim 1, wherein said first element and said at least one second element are balls having diameters larger than diameters of the first orifice and at least one second orifice.

12. A steam trap as claimed in claim 11, wherein said balls are secured, typically by welding respectively to wings of moveable pivoted members of said lever and link arrangement.

13. A steam trap as claimed in claim 12, wherein said wings are fitted to pivot pins angularly displaceable in a pivot frame.

\* \* \* \* \*